(12) United States Patent
Tei

(10) Patent No.: US 7,120,361 B2
(45) Date of Patent: Oct. 10, 2006

(54) WAVELENGTH TUNABLE MULTIPLEXING AND DEMULTIPLEXING FILTER DEVICE AND WAVELENGTH ROUTING DEVICE

(75) Inventor: Masataka Tei, Kasugai (JP)

(73) Assignee: Santec Corporation, Komaki (JP)

( * ) Notice: Subject to any disclaimer, the term of this patent is extended or adjusted under 35 U.S.C. 154(b) by 724 days.

(21) Appl. No.: 10/265,193

(22) Filed: Oct. 7, 2002

(65) Prior Publication Data
US 2003/0081286 A1  May 1, 2003

(30) Foreign Application Priority Data
Oct. 10, 2001  (JP)  ............... 2001-312431

(51) Int. Cl.
H04J 14/00 (2006.01)
H04J 14/02 (2006.01)
H04B 10/12 (2006.01)
G02B 27/14 (2006.01)

(52) U.S. Cl. ............... 398/85; 398/43; 398/79; 398/149; 359/629; 359/634

(58) Field of Classification Search ............... 398/43, 398/79, 85, 149; 359/629, 633, 634, 636
See application file for complete search history.

(56) References Cited

U.S. PATENT DOCUMENTS 5,812,291 A * 9/1998 Bendelli et al. ............... 398/85

6,008,920 A * 12/1999 Hendrix ............... 398/79

FOREIGN PATENT DOCUMENTS

JP  10-093505 A  10/1998
JP  11-027239 A  1/1999

OTHER PUBLICATIONS

J.S Patel and Y. Silberberg, Liquid Crystal and Grating-Based Multiple-Wavelength Cross-Connect Switch, IEEE Photonics Technology Letters, May 1995, pp. 514-516, vol. 7, No. 5, IEEE, Red Banks, NJ, USA.
H.G. Limberger et al., Wideband Tunable Fibre Bragg Grating Filters, European Conference on Optical Communications (ECOC) 1999, Sep. 1999, pp. 156-159, ECOC, Nice, France.

* cited by examiner

Primary Examiner—M. R. Sedighian
(74) Attorney, Agent, or Firm—Smith Patent Office

(57) ABSTRACT

Two set of filter chips on the upper and lower surfaces, each of which has a wavelength characteristic corresponding to each wavelength component of wavelength-multiplexed light, are mounted on a transparent substrate to make an optical filter element. When the wavelength-multiplexed light is inputted to the optical filter element via an optical fiber and when the same light components as those having the wavelengths demultiplexed by an optical fiber is also inputted, the demultiplexed light and the replaced wavelength-multiplexed light will be obtained at another optical fibers, respectively.

10 Claims, 10 Drawing Sheets

WAVELENGTH TUNABLE MULTIPLEXING AND DEMULTIPLEXING FILTER DEVICE AND WAVELENGTH ROUTING DEVICE

BACKGROUND OF THE INVENTION

1. Field of the Invention

The present invention relates to a wavelength tunable multiplexing and demultiplexing filter device which is used for adding and dropping wavelength components (add-drop) in an optical network system to demultiplex and multiplex light of arbitrary wavelengths from optical signals, and to a wavelength routing device which uses the wavelength tunable multiplexing and demultiplexing filter device.

2. Discussion of the Related Art

With the progress of technologies used for optical wavelength multiplexing division and transmission in optical communication systems, a more versatile and more flexible optical transmission system has been required. In an optical transmission system, light of a desired wavelength must be picked up from an optical signal where wavelengths have been multiplexed at an arbitrary node, or light of a desired wavelength must be added to such optical signals to send them as wavelength domain multiplexed light.

FIG. 1 illustrates the configuration of a conventional four-channel optical add-drop system. In this figure, wavelength-multiplexed light is added to an optical demultiplexing filter device 101 and then the desired wavelengths, for example, $\lambda 1$, $\lambda 2$, $\lambda 3$, and $\lambda 4$ are demultiplexed from the multiplexed wavelengths $\lambda 1$ through $\lambda n$. Light of the demultiplexed wavelengths goes to optical switches 102a through 102d. Signals of newly modulated wavelengths $\lambda 1$ through $\lambda 4$ simultaneously enter the optical switches 102a through 102d, respectively. The optical switches 102a through 102d have two input terminals and two output terminals. They select the signals demultiplexed by the optical demultiplexing filter device 101 and the newly modulated signals of $\lambda 1$ through $\lambda 4$ based on external control signals, and then output them from the two output terminals. The output from each of the optical switches is given to a multiplexing filter device 105 via optical tunable attenuators 103a through 103d and splitting devices 104a through 104d. The splitting devices 104a through 104d extract some of the output from the optical tunable attenuators 103a through 103d and then output it to a monitor 106. The intensities of wavelengths are adjusted at the same level by controlling the output from the optical tunable attenuators via the monitor 106.

For such a conventional optical demultiplexing filter device, the selected wavelengths are previously fixed at $\lambda 1$ through $\lambda 4$. The number of channels will increase to dozens or several hundred in the near future. This will require multiplexing or demultiplexing light on that number of channels when arbitrary wavelengths are to be selected. For this reason, when an arbitrary channel is selected, all the channels must be temporarily disassembled and then the necessary channel must be selected from them. This causes disadvantages in making the scale of the communication system larger and increasing the transmission losses. At ordinary transmission nodes other than those using optical cross connections in a large-scaled matrix, the ability to select optical signals on several channels is good enough for the purposes of routing, add-drop, and it is desired that arbitrary wavelengths can be selected from a number of channels unlike the conventional fixed wavelengths.

SUMMARY OF THE INVENTION

The present invention has been made with attention given to the conventional problems. Accordingly, it is an object of the invention to provide a wavelength tunable multiplexing and demultiplexing filter device, and wavelength routing device which are used at transmission nodes or the like in a wavelength-multiplexed optical transmission system in order to select arbitrary wavelengths.

The wavelength tunable multiplexing and demultiplexing device of the invention is used to demultiplex and multiplex arbitrary wavelength components of wavelength-multiplexed light. It comprises an optical filter element, first and second light emitting units, first and second light receiving units, moving unit, and controller. The optical filter element uses two sets of multiple filter chips which respectively transmit at least one different wavelength components of the wavelength-multiplexed light, and is provided with a pair of filter chips which have the same wavelength characteristic in the mutually corresponding positions on respective sides of a substrate. The first light emitting unit is used to let the wavelength-multiplexed light enter the optical filter element from a specific direction. The second light emitting unit is used to let arbitrary wavelength components of the wavelength-multiplexed light enter the optical filter element from a specific direction. The first light receiving unit is located on the same optical axis as the first light emitting unit and used to receive the light from the first light emitting unit, which has been transmitted through the optical filter element. The second light receiving unit is located on the same optical axis as the second light emitting unit. The second light receiving unit used to receive the light from the second light emitting unit, which has been transmitted through the optical filter element, and the light from the first light emitting unit, which has been reflected at the pair of filter chips on the optical filter element. The moving unit is used to move the optical filter element in the direction of the aligned filter chips so that the light from the first and second light emitting units enters different filter chips. The controller is used to control the moving unit in accordance with the wavelengths to be multiplexed or demultiplexed.

The routing device of the invention is provided with at least one pair of the wavelength tunable multiplexing and demultiplexing filter device, and the routing device demultiplexes at least one of wavelength components from wavelength-multiplexed light and multiplexes the same wavelength components as the demultiplexed one with the residual wavelength-multiplexed light.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Embodiment 1

Figure 1:
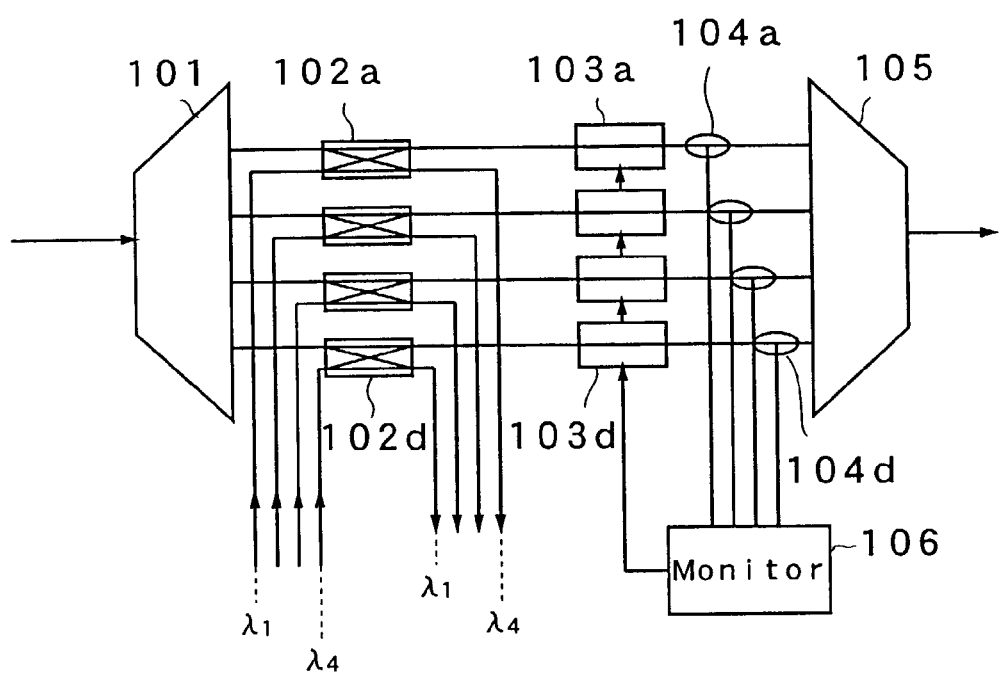
FIG. 1 is a block diagram illustrating the configuration of a conventional wavelength tunable multiplexing and demultiplexing filter device according to the prior art.
Figure 2:
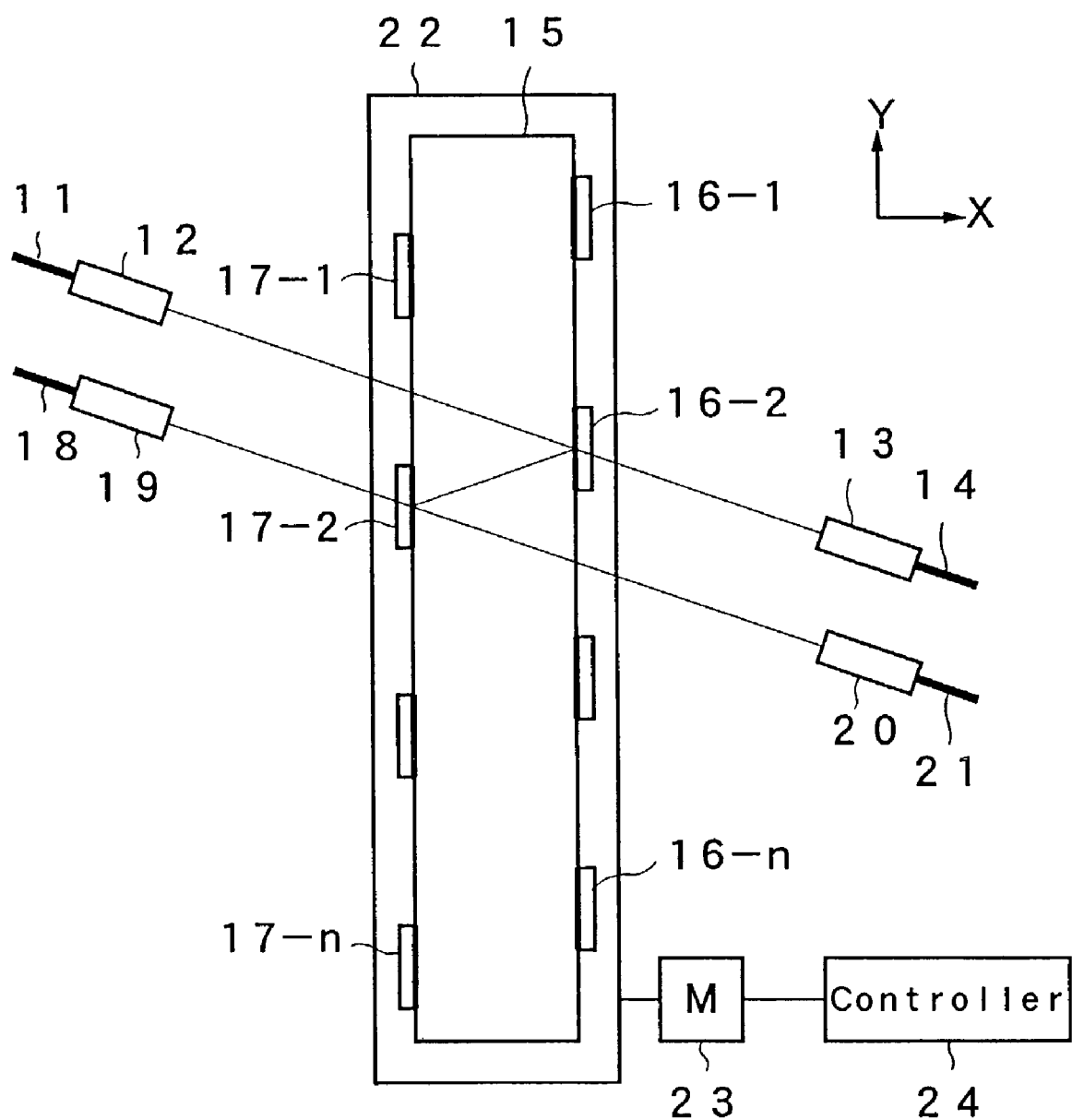
FIG. 2 schematically illustrates the configuration of a wavelength tunable multiplexing and demultiplexing filter device according to a first embodiment of the present invention.

FIG. 2 is a schematic illustration showing the configuration of a wavelength tunable multiplexing and demultiplexing filter device according to a first embodiment of the present invention. In the illustration, wavelength domain multiplexed signal light of wavelengths λ1 through λn enter the wavelength tunable multiplexing and demultiplexing filter device. An optical fiber 11 for inputting the light is connected to a collimate lens 12. The collimate lens 12 is used to convert the input light into parallel light beams of specific width. On its optical axis, a collimate lens 13 for receiving light is provided. An optical fiber 14 is connected to the collimate lens 13. The optical fiber 11 and the collimate lens 12 constitute the first light emitting unit. The collimate lens 13 and the optical fiber 14 constitute the first light receiving unit. An optical filter element 15 is provided between the collimate lenses 12 and 13 so that the input light is slightly inclined from a line perpendicular to a longitudinal axis of the optical filter element 15.

Figure 3:
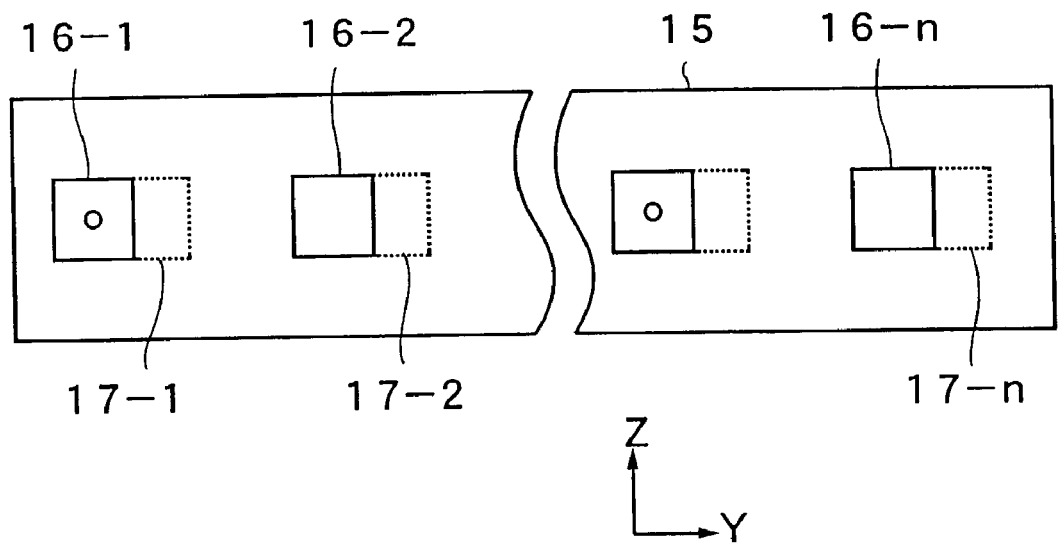
FIG. 3 is a front view illustrating the relation between an optical filter element and the input position of light according to the first embodiment of the present invention.

The optical filter element 15 as used in this embodiment, for example, has many filter chips 16-1 through 16-n laid out at equal intervals on a surface of a glass plate. The glass plate is a rectangular transparent flat substrate as illustrated in FIG. 3. The optical filter element and has filter chips 17-1 through 17-n laid out at equal intervals on the second or reverse surface. The filter chips 16-1 through 16-n and 17-1 through 17-n in each set are slightly deviated, as illustrated in the figure, toward the direction of the aligned filter chips. The filter chips 16-1 through 16-n and 17-1 through 17-n are interference light filters which have a dielectric multi-layer created by alternately layering dielectric film with a high refractive index, for example, $Ta_2O_5$ (refractive index $n_H$=2.1) and a dielectric film with a low refractive index, for example, $SiO_2$ (refractive index $n_L$=1.4). Each dielectric layer is alternately layered on the substrate by an ion beam sputter method, an ion-assisted vapor deposition method, an ion plating method, or other methods known in the art. The thickness $d_H$ of the dielectric layer with a high refractive index and the thickness $d_L$ of the dielectric layer with a low refractive index meet the following equations, respectively:

$$d_H = \lambda/4n_H$$

$$d_L = \lambda/4n_L$$

where λ is transmission wavelength at each filter chip for a band pass filter. The multi-layer structure of the filter chip includes a cavity layer which is used to make the filter flat on top. It is preferable that the cavity layer be of double or triple cavities.

Figure 4:
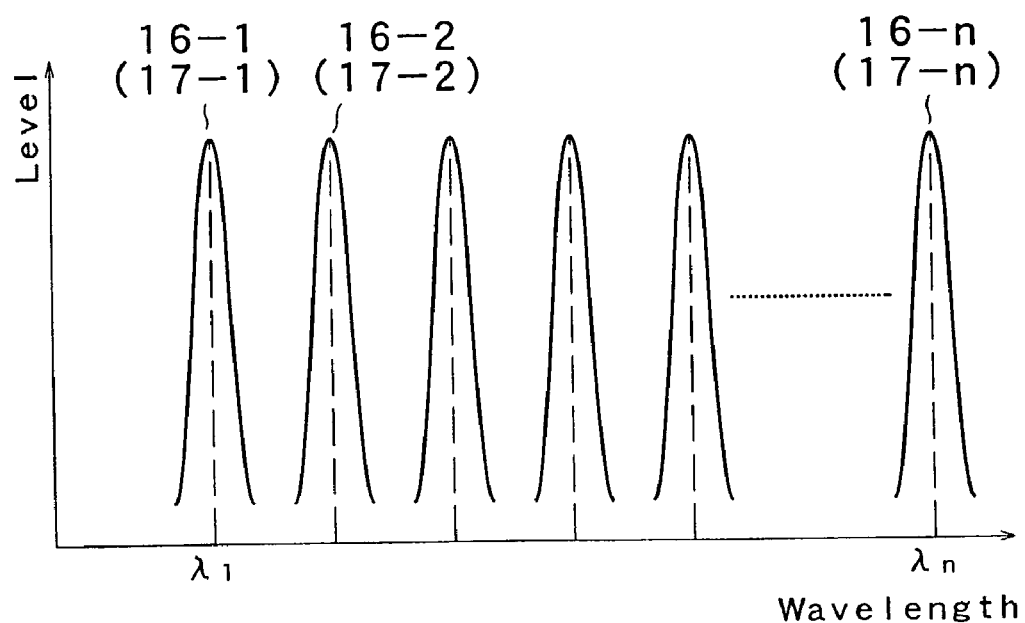
FIG. 4 illustrates the wavelength transmission characteristic of filter chips for the optical filter element according to the first embodiment of the present invention.

FIG. 4 illustrates the selection characteristic of each of the filter chips 16-1 through 16-n and 17-1 through 17-n. Each filter chip shall have a characteristic corresponding to λ1 through λn of the incoming wavelength-multiplexed light. This means that both of central wavelengths of the filter chips 16-k and 17-k are transmission wavelength λk (k=1 through n) and it is selected so that it becomes the wavelength of the wavelength domain multiplexed light.

As described later, the light has passed between the filter chips 17-(i-1) and 17-i on the optical filter element and has transmitted through the substrate from the first light emitting unit is inputted into the filter chip 16-i (i=2 in this case). The light reflected at the filter chip 16-i will be reflected again at the filter chip 17-i as illustrated in FIG. 2. A second light emitting unit which aligns this reflected light with the optical axis is provided. The second light emitting unit comprises an optical fiber 18 and a collimate lens 19. On the optical axis, a collimate lens 20 and an optical fiber 21 are provided in a position where they are adjacent to the first light receiving unit via the optical filter element 15. The collimate lens 20 and the optical fiber 21 constitute a second light receiving unit. The optical filter element 15 is located on a linear slider 22 so that it can freely move in the direction where the filter chips are aligned (Y-axis). The linear slider 22 is connected to a moving unit 23 including a motor, and structured so that it can freely move in the Y-axis direction in the figure. The linear slider 22 can be moved by a mechanism comprising a rack and a pinion. In this case, the rack is formed on a lower surface of the linear slider 22 in the Y-axis direction, and the rack is engaged with the pinion not shown. The pinion is connected to the motor of the moving unit 23 through a speed-reducing mechanism. The linear slider 22 can be moved in the Y-axis direction by driving this pinion. A controller 24 is used to change the input position on the optical filter element 15 by moving the optical filter element 15 to a specific position via the moving unit 23 and to select the wavelength component of the inputted light.

Figure 5A:
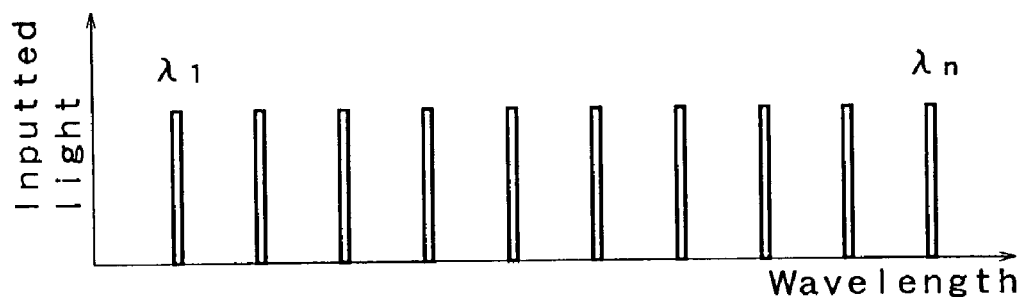
FIG. 5A is a wavelength spectrum of light inputted from a first light emitting unit.
Figure 5B:
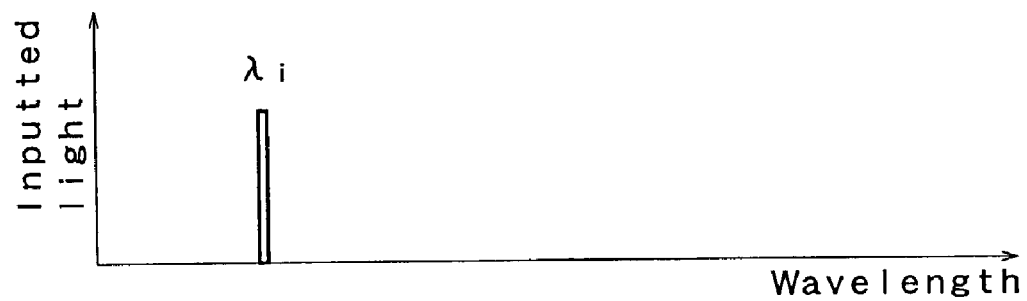
FIG. 5B is a wavelength spectrum of light inputted from a second light emitting unit.
Figure 5C:
FIG. 5C is a wavelength spectrum of light obtained at a first light receiving unit.
Figure 5D:
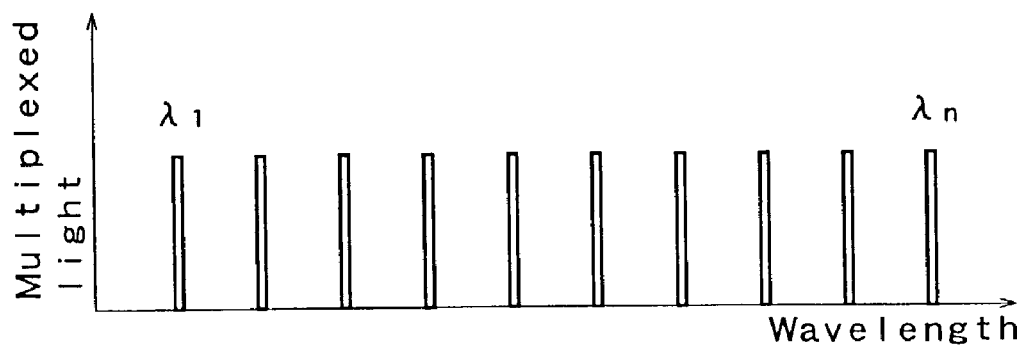
FIG. 5D is a wavelength spectrum of light obtained at a second light receiving unit.

FIG. 5A shows wavelengths λ1 through λn of the wavelength-multiplexed light in the optical fiber 11 for input to the optical filter element 15. FIG. 5B shows the light of wavelength λi inputted from optical fiber 18. As illustrated in FIG. 2, only λi can be selected from the wavelength-multiplexed light in a position S1 where light enters the filter chip 16-$i$ ($i=2$ in this case) of the optical filter element 15. The solid line in FIG. 5C indicates the light which is obtained at the first light receiving unit, that is, the transmitted light of wavelength $\lambda i$ only. The dotted line in FIG. 5C indicates the transmission characteristic of the filter chip 16-$i$. In this state, as illustrated in FIG. 5B, the light from the second light emitting unit has the wavelength $\lambda i$ component and is transmitted through the filter chip 17-$i$. The wavelength-multiplexed light excluding $\lambda i$, which has been reflected at the filter chip 16-$i$, is reflected again at the filter chip 17-$i$. The reflected light enters the optical fiber 21 via the collimate lens 20, together with the input light component of $\lambda i$ from the optical fiber 18. FIG. 5D illustrates the multiplexed light which is obtained at the second light receiving unit. In this light, the signal light of the wavelength $\lambda i$ component filtered by the filter chip 16-$i$ is replaced by another signal light of the wavelength $\lambda i$ component which has entered from the second light emitting unit.

When the optical signal of other wavelength $\lambda j$ is to be selected, the optical filter element 15 is moved by operating the moving unit 23 via the controller 24. In this case, the input light of wavelengths $\lambda 1$ to $\lambda n$ from the optical fiber 11 enters the filter chip 16-$j$, and the input light of wavelength $\lambda j$ from the optical filter 18 enters the filter chip 17-$j$. Light of the wavelength $\lambda j$ passes through the optical filter 16-$j$ and enters the optical fiber 14 as output light. The wavelength-multiplexed light excluding $\lambda j$, which has been reflected at the filter chip 16-$j$, is reflected again at the filter chip 17-$j$. The reflected light enters the optical fiber 21 via the collimate lens 20, together with the input light component of $\lambda j$ from the optical fiber 18. Thus, the optical signal of any arbitrary wavelength can be dropped by moving the optical filter element 15 via the controller 24.

Embodiment 2

Figure 6:
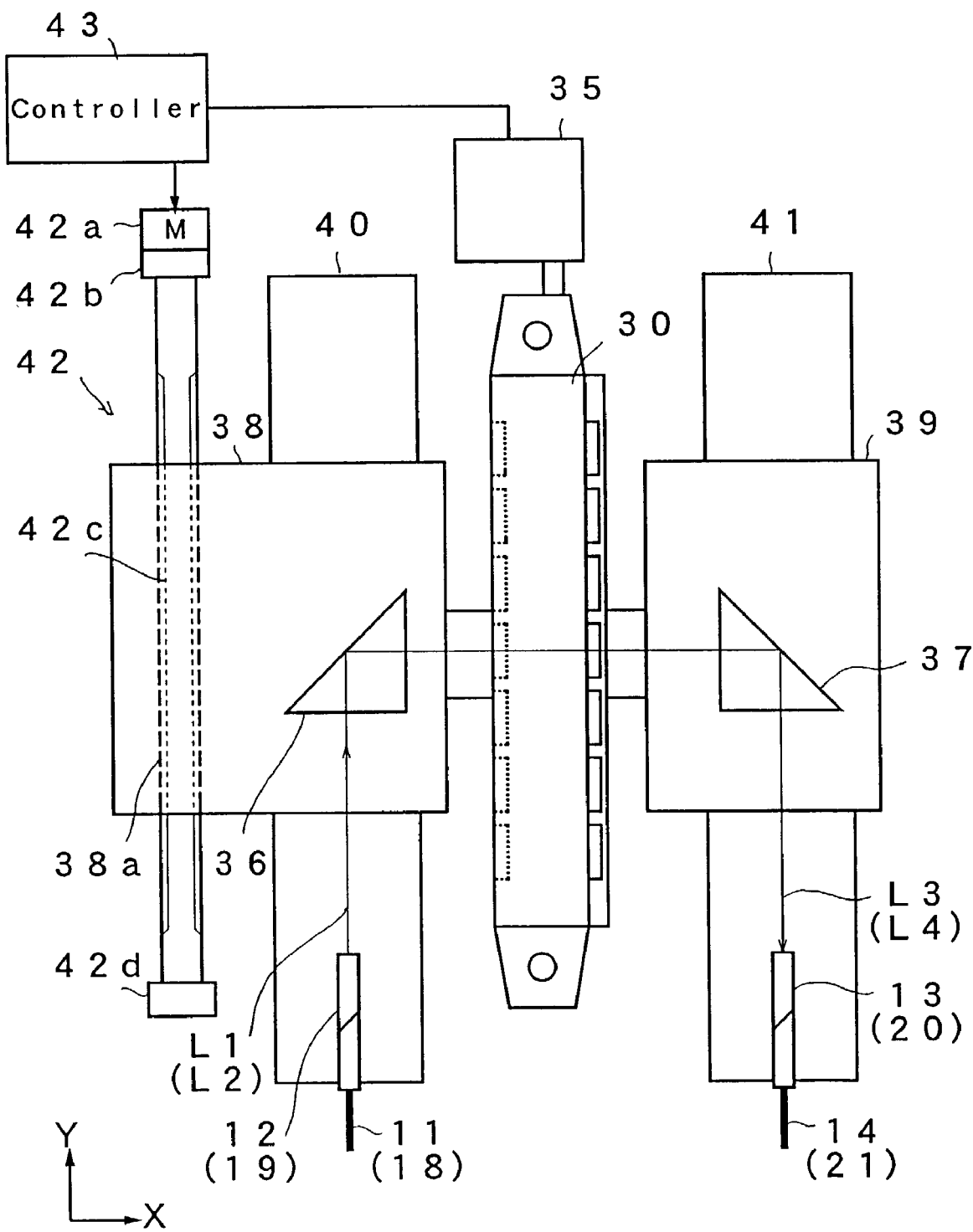
FIG. 6 schematically illustrates the configuration of a wavelength tunable multiplexing and demultiplexing filter device according to a second embodiment of the present invention.
Figure 7A:
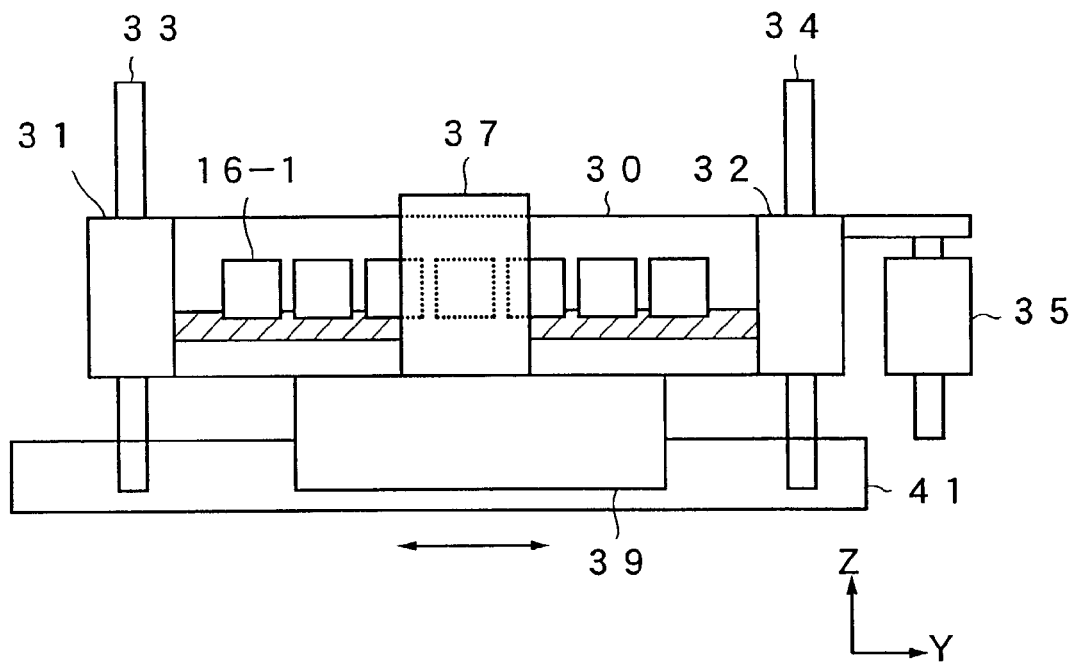
FIGS. 7A and 7B are side views illustrating the configuration of a wavelength tunable multiplexing and demultiplexing filter device according to the second embodiment of the present invention.
Figure 7B:
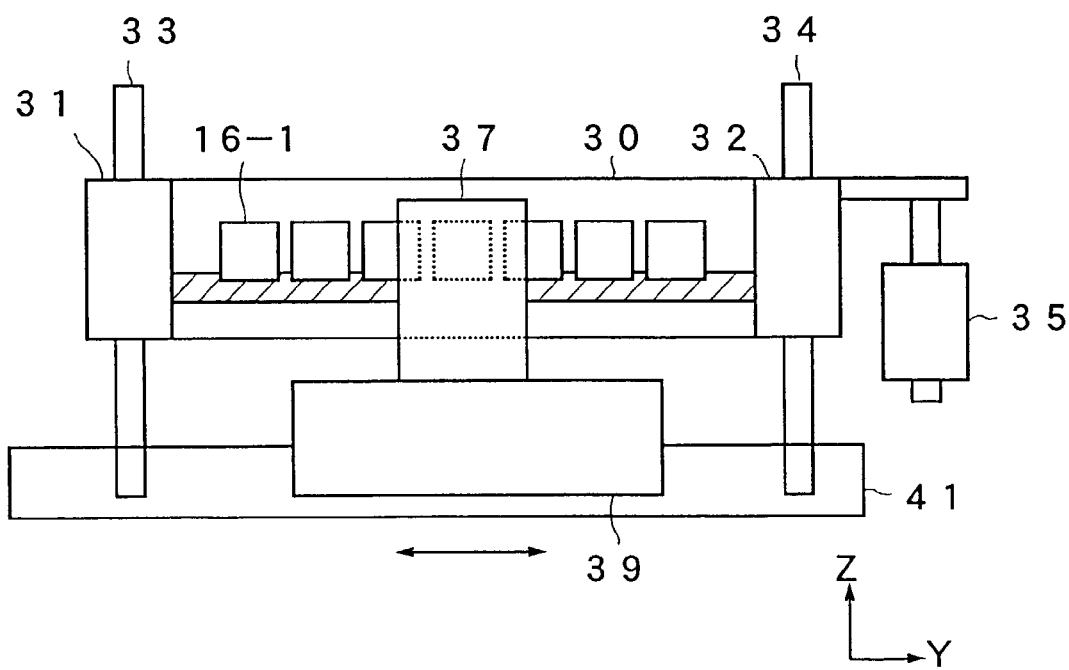

FIG. 6 illustrates the configuration of a wavelength tunable multiplexing and demultiplexing filter device as in a second embodiment of the invention. FIGS. 7A and 7B are side views of the device. In the second embodiment, an optical fiber 11 and a collimate lens 12 are used as a first light emitting unit. A collimate lens 13 and an optical fiber 14 are used as a first light receiving unit. An optical fiber 18 and a collimate lens 19 are used as a second light emitting unit. A collimate lens 20 and an optical fiber 21 are used as a second light receiving unit. In FIG. 6, the second light receiving unit is located just under the first one. An optical filter element 30 is provided between the two light emitting units and the two light receiving units. As illustrated in FIGS. 7A and 7B, the optical filter element 30 has bearings 31 and 32 on the left and right sides, respectively. The optical filter element 30 is supported by guide shafts 33 and 34 so that it can be freely moved a specific distance in the Z-axis direction. As described later, the optical filter element 30 is slightly inclined from the Z-axis. It can be moved in the Z-axis direction using an actuator 35 which comprises a linear motor, an electromagnet, and others.

As shown in FIG. 6, a prism 36 is provided in a position where the light from the optical fibers 11 and 18 are reflected to the optical filter element 30. A prism 37 is provided in an position where the reflected light and transmitted light as described later are sent to the collimate lenses 13 and 20, respectively. The prisms 36 and 37 are used to reflect the incoming and outgoing light in the vertical direction. The prisms 36 and 37 form reflecting units. These prisms are located on sliders 38 and 39, respectively. The sliders 38 and 39 are connected to each other below the optical filter element 30, and structured so that they can be freely and simultaneously moved in the Y-axis direction on bases 40 and 41. An actuator 42 is used to move the sliders 38 and 39 in the Y-axis direction. The bearings 31 and 32, the guide shafts 33 and 34, the actuators 35 and 42, the sliders 38 and 39, and the bases 40 and 41 are located in a moving unit which is used to move the optical filter element in the Y-axis and Z-axis directions. A controller 43 is used to control the actuators 35 and 42.

The actuator 42 includes a motor 42$a$, a reduction gear unit 42$b$, a lead screw 42$c$, and a holder 42$d$. The lead screw 42$c$ is rotatably held by the reduction gear unit 42$b$ and the holder 42$d$ at both ends thereof. The female screw 38$a$ is formed in the slider 38 and is engaged to the lead screw 42$c$.

The motor 42$a$ of the actuator 42 rotates the lead screw 42$c$ through the reduction gear unit 42$b$. Since the female screw 38$a$ is in engagement with the lead screw 42$c$, the slider 38 is driven in the Y-axis direction, and both sliders 38 and 39 can move in the Y-axis direction. As shown in FIGS. 7A and 7B, for example, the actuator 35 comprises a push-pull solenoid. If the push-pull solenoid is formed into a latch-type solenoid, it is possible to move the optical filter element 30 to two positions in the Z-axis direction by energizing the solenoid.

Figure 8:
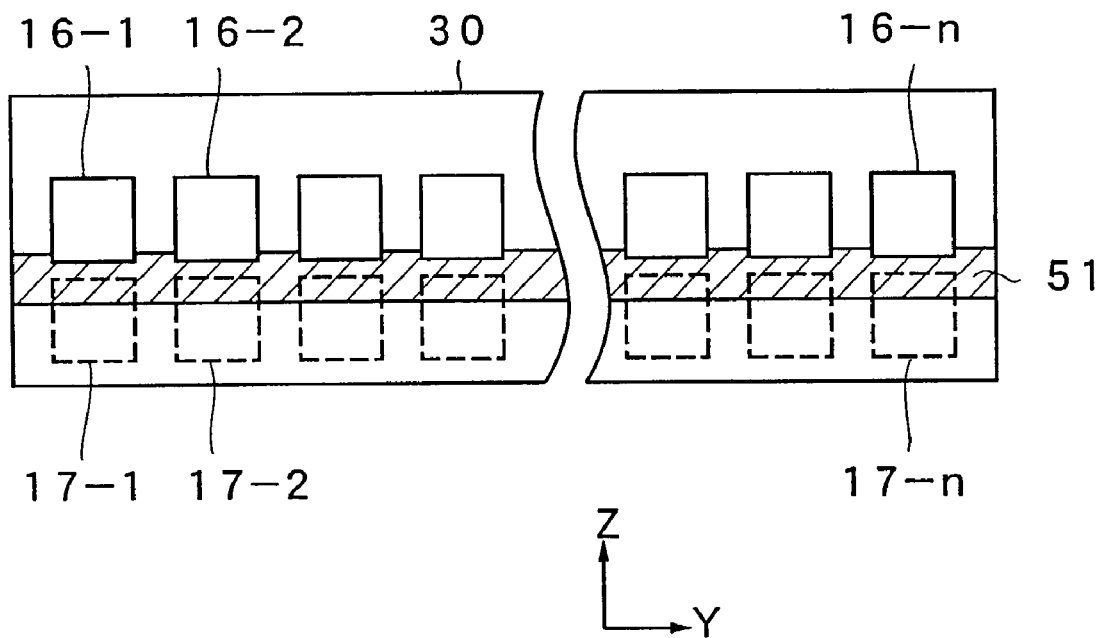
FIG. 8 is a front view of an optical filter element according to the second embodiment of the present invention.
Figure 9:
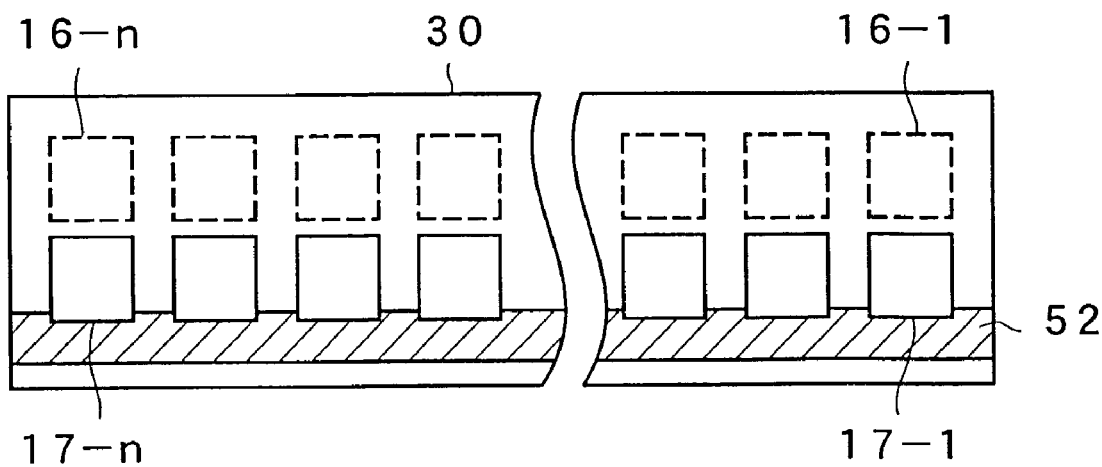
FIG. 9 is a rear view of the optical element according to the second embodiment of the present invention.

The optical filter element 30 is illustrated in its front view in FIG. 8 and its rear view in FIG. 9. The optical filter element 30 is a transparent flat plate, and has a strip-like reflective surface 51 formed in the longitudinal direction on the first side of the glass substrate. In positions contacting with the reflective surface 51, filter chips 16-1 through 16-$n$ as in the first embodiment are laid out as shown in the figure. As illustrated in FIG. 9, filter chips 17-1 through 17-$n$ are laid out on the second surface of the glass substrate. In the opposite corresponding position of the filter chip 16-1, the filter chip 17-1 is located. Similarly, the subsequent filter chips are laid out in the mutually corresponding positions, which are deviated in the Z-axis direction. A strip-like reflective surface 52 is formed in a position contacting with the filter chips 17-1 through 17-$n$ on the reverse side.

Figure 10:
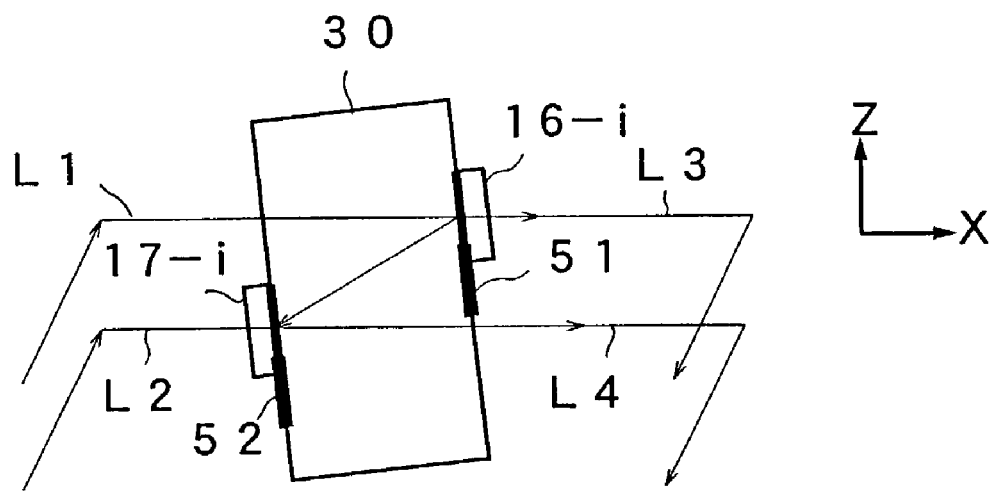
FIG. 10 illustrates the input state on an optical filter of the optical filter element for the wavelength tunable multiplexing and demultiplexing filter device according to the second embodiment of the present invention.

The operation in this embodiment will be described. As illustrated in FIG. 10, the inputted light from the optical fibers 11 and 18 passes through optical axes L1 and L2 via the collimate lenses 12 and 19 and is then reflected at the prism 36. In the state of FIG. 10, the light from the optical fiber 11 enters the filter chip 16-$i$ on the optical filter element 30 and the input light from an optical fiber 18 enters the filter chip 17-$i$. In this state, only the wavelength $\lambda i$ component of the inputted light from the optical axis L1 passes through the filter chip 16-$i$, is reflected at the prism 37, passes through the optical axis L3, and then enters the optical fiber 14 via the collimate lens 13. Thus, the light of wavelength $\lambda i$ can be demultiplexed. In this case, the components other than the $\lambda i$ component are, as illustrated in FIG. 10, reflected at the filter chip 16-$i$, reflected again at the filter chip 17-$i$, transmitted through the glass substrate, and then reflected at the prism 37. The light passes along the optical axis L4, and then enters the optical fiber 21 through the collimate lens 20. The inputted light from the optical fiber 18 enters the filter chip 17-$i$, passes through it, overlaps with the optical axis L4, is reflected at the prism 37, and then enters the optical fiber 21 via the collimate lens 20. Thus, the light can be multiplexed with the wavelength-multiplexed light obtained from the optical axis L1.

Figure 11:
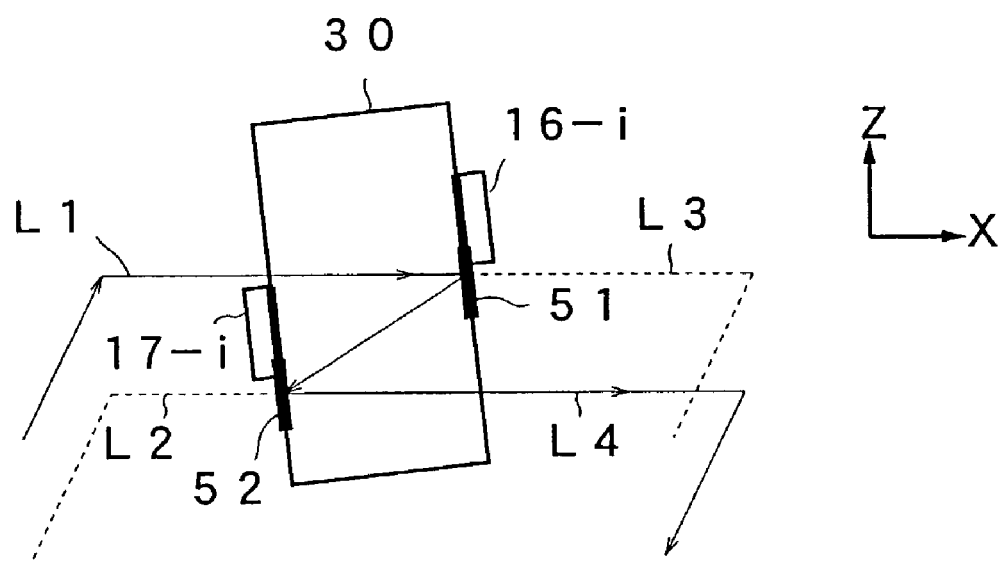
FIG. 11 illustrates the input state on the optical filter of the optical filter element for the wavelength tunable multiplexing and demultiplexing filter device according to the second embodiment of the present invention.

In this state, when the wavelength of the multiplexed and demultiplexed light is changed from $\lambda i$ to $\lambda j$, the actuator 35 is driven to move the optical filter element 30 in parallel with the guide shafts 33 and 34 in the Z-axis direction as illustrated in the FIG. 7B. As shown in FIG. 11, the inputted light on the optical axis L1 then enters the reflective surface 51 on the lower part of the filter chip 16-*i*. In this case, since all wavelength components of the light are reflected, they are returned to the inside of the optical filter element 30 and then are reflected again at the reflective surface 52 on the opposite side. Therefore, they are reflected at the prism 37 and all the reflected light enters the collimate lens 20 and the optical fiber 21 via the optical axis L4. In this case, the light from the second light emitting unit is blocked by the reflective surface 52 without entering the optical filter element 30. In this state, the sliders 38 and 39 are moved in the Y-axis direction using the actuator 42. The position where the emitted light is reflected by the two reflective surfaces is referred to as a second position.

When the sliders 38 and 39 reach the position on the lower part of the filter chip 16-*j*, which permits the desired wavelength $\lambda j$ to pass through, they are stopped from moving in the Y-axis direction. Next, the optical filter element 30 is moved in the opposite direction of the Z-axis via the actuator 35. This causes the input lights to enter the filter chips 16-*j* and 17-*j*. As in the case shown in FIG. 10, only the wavelength $\lambda j$ component is transmitted and then obtained at the optical fiber 14 for output light via the prism 37. The wavelength components other than $\lambda j$ are reflected at the reflective surface 51 and filter chip 17-*j* as in FIG. 10, and then multiplexed with the signal light of newly added wavelength component $\lambda j$, and then obtained at the optical fiber 14 for output via the prism 37. This allows for changing the selected wavelength while ensuring that the wavelength-multiplexed light does not stop and that light of wavelengths between $\lambda i$ and $\lambda j$ does not sequentially enter the optical fiber 14.

In the first and second embodiments, many filter chips are aligned as optical filter elements on a flat plate. However, the optical filter element may be shaped like a ring to lay out the filter chips uniformly on such a ring surface. Alternatively, the optical filter element may be shaped like a disc to lay out filter chips radiately on such a disc surface. This allows for moving the optical filter element easily for the purpose of selecting a filter chip.

In the present embodiment, the moving unit moves the optical filter element 30 temporarily in the Z-axis direction. The moving unit may also move the optical filter element 30 to a direction having a vertical component in the Y-axis direction in order to prevent the limited light from entering into any filter chips.

In each of said embodiment, if the demultiplexed signal light is not necessary, the first light receiving unit may be omitted to use the second light receiving unit only.

Embodiment 3

Figure 12:
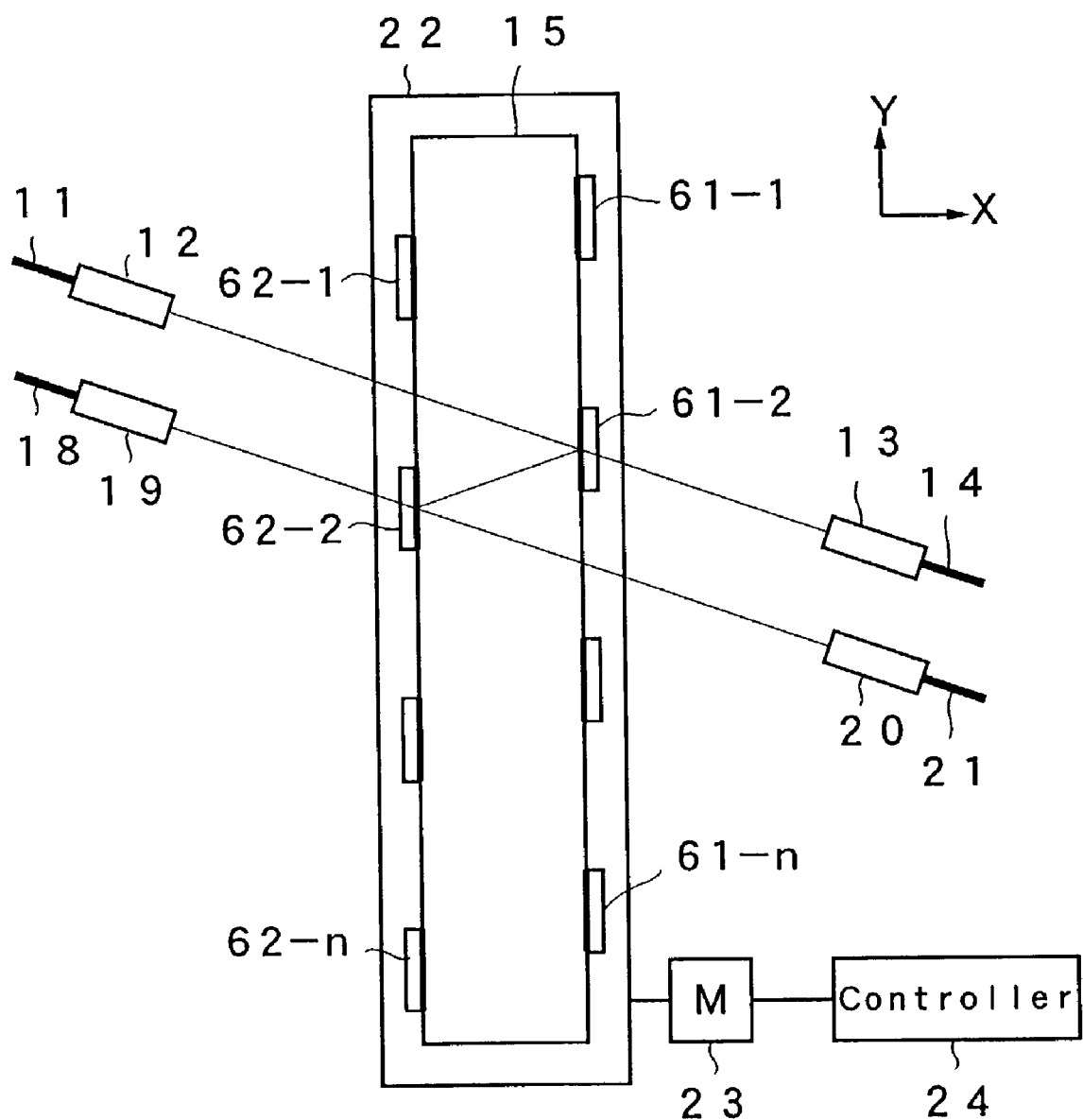
FIG. 12 schematically illustrates the configuration of a wavelength tunable multiplexing and demultiplexing filter device according to a third embodiment of the present invention.

The third embodiment of the present invention will now be described. The former embodiments use a filter chip which transmits each wavelength component of wavelength-multiplexed light. However, the filter chip may have such bandwidth that allows one or more wavelength components to be transmitted simultaneously. FIG. 12 schematically illustrates the configuration of the wavelength tunable multiplexing and demultiplexing filter device in the third embodiment. The same parts as in the first embodiment are given the same symbols and their detailed description has been omitted. Filter chips 61-1 through 61-*n* and 62-1 through 62-*n* are used in demultiplexing an arbitrary wavelength. This means that the number of wavelengths of wavelength-multiplexed light to be demultiplexed by the filter chips can be specified as appropriate for each filter chip. For example, the filter chips 61-1 and 62-1 transmit the wavelengths of wavelength-multiplexed light $\lambda 1$ through $\lambda 3$, the filter chips 61-2 and 62-2 transmit the wavelengths of wavelength-multiplexed light $\lambda 4$ through $\lambda 6$, and the filter chips 61-3 and 62-3 transmit three wavelengths of wavelength-multiplexed light $\lambda 7$ through $\lambda 9$. The subsequent filter chips 61-4 and 62-4 also transmit each three consecutive wavelengths. This allows for demultiplexing multiple wavelengths with a relatively simple configuration.

The number of wavelengths of wavelength-multiplexed light which is to be multiplexed and demultiplexed by filter chips may be freely specified without restricting it to three wavelengths. For example, the filter chips 61-2 and 62-2 multiplexes and demultiplexes three wavelengths $\lambda 3$ through $\lambda 5$, and the filter chips 61-3 and 62-3 multiplexes and demultiplexes two wavelengths $\lambda 6$ and $\lambda 7$. This allows for freely multiplexing and demultiplexing into desired wavelength components by changing the input position of wavelength-multiplexed light.

Embodiment 4

Figure 13:
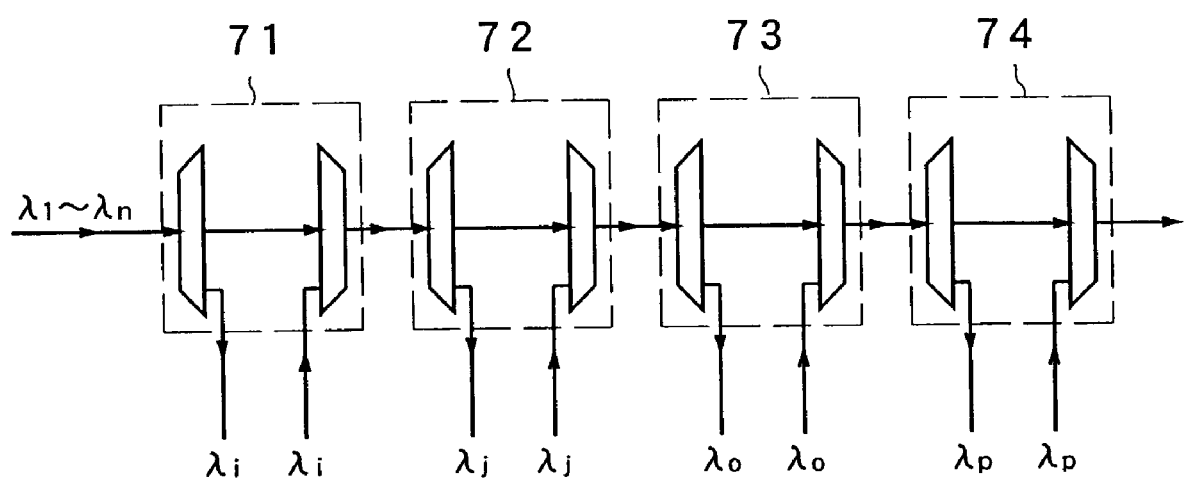
FIG. 13 schematically illustrates a wavelength routing device according to a forth embodiment of the present invention.

FIG. 13 schematically illustrates a wavelength routing device which uses the wavelength tunable multiplexing and demultiplexing filter device. In this figure, 71, 72, 73, and 74 indicate wavelength tunable multiplexing and demultiplexing filter devices in the first or second embodiment, which allows arbitrary wavelengths $\lambda i$, $\lambda j$, $\lambda o$, and $\lambda p$ (i, J, o, p=1 through n) to be demultiplexed and multiplexed when wavelength-multiplexed light of $\lambda 1$ through $\lambda n$ has entered. When wavelength tunable multiplexing and demultiplexing devices are connected in series as described above, arbitrary four wavelengths can be demultiplexed on the demultiplexing side, and a light of same wavelength light can be inputted on the multiplexing side. Thereby, the multiplexing and demultiplexing filter devices can be outputted as wavelength-multiplexed light by multiplexing residual light with other signal light of the same wavelengths. It is therefore possible to add or drop arbitrary wavelengths and to exchange or route signals between different wavelengths. A flexible wavelength multiplexing transmission system can be configured in accordance with required conditions.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2001-312431 filed on Oct. 10, 2001 is hereby incorporated by reference.

What is claimed is:

1. A wavelength tunable multiplexing and demultiplexing filter device which demultiplexes and multiplexes arbitrary wavelength components from wavelength-multiplexed light, comprising:

an optical filter element having a transparent substrate with two sides parallel to each other, said optical filter element having multiple filter chips arranged in two straight line arrangements, said multiple filter chips respectively transmit at least one of the wavelength components of the wavelength-multiplexed light and said multiple filter chips including a pair of filter chips with the same wavelength characteristic, said pair of filter chips being disposed in mutually corresponding positions on respective sides of said transparent substrate;

a first light emitting unit which emits the wavelength-multiplexed light into said optical filter element from a specific direction;

a second light emitting unit which inputs arbitrary wavelength components of the wavelength-multiplexed light into said optical filter element from a specific direction;

a first light receiving unit which is located on the same optical axis as said first light emitting unit and receives the light transmitted through said optical filter;

a second light receiving unit which is located on the same optical axis as said second light emitting unit and receives the light from said second light emitting unit, which has been transmitted through said optical filter element, and the light from said first light emitting unit, which has been reflected at said pair of filter chips on said optical filter element;

a moving unit which moves said optical filter element in the direction of said multiple filter chips so that the light from said first light emitting unit and light from second light emitting unit enter different filter chips; and a controller which controls said moving unit in accordance with the wavelength to be multiplexed and demultiplexed.

2. A wavelength tunable multiplexing and demultiplexing filter device according to claim 1, wherein
said optical filter element has said pair of filter chips deviated in the direction of said multiple filter chips.

3. A wavelength tunable multiplexing and demultiplexing filter device according to claim 1, wherein
said optical filter element is formed on a transparent substrate having first and second surfaces parallel to each other, said first surface on which said one of each paired filter chips are mounted has first reflective area partially contacting each of said filter chips in either set; said second surface on which said other each paired filter chips are mounted has second reflective surface area partially contacting each of said filter chips;

said moving unit moves said optical filter element to a first position so that said first and second input lights from said first and second light emitting units can be inputted into said one pair of second filter chips and reflected component of first input light is reflected on the second surface and then multiplexed with said second input light and to a second position so that said all component of said first input light is reflected on said first and second surfaces and then sent out, in a first direction relative to said filter chips and in a second direction vertical to said first direction within a surface of said optical filter element.

4. A wavelength tunable multiplexing and demultiplexing filter device according to claim 3, further comprising:
a reflecting units which reflect the lights inputted by said first and second light emitting units and the lights obtained through said optical filter element, toward said first and second light receiving units;

wherein said moving unit moves said reflecting units in a first direction of optical axes of said first and second light emitting units and said first and second light receiving units and in a second direction having a vertical component of said first direction.

5. A wavelength tunable multiplexing and demultiplexing filter device which demultiplexes and multiplexes arbitrary wavelength components from wavelength-multiplexed light, comprising:

an optical filter element having a transparent substrate with two sides parallel to each other, said optical filter element having multiple filter chips arranged in two straight line arrangements, said multiple filter chips which respectively transmit at least one of the wavelength components of the wavelength-multiplexed light and said multiple filter chips including a pair of filter chips with the same wavelength characteristic, said pair of filter chips being disposed in mutually corresponding positions on respective sides of said transparent substrate;

a first light emitting unit which emits the wavelength-multiplexed light into said optical filter element from a specific direction;

a second light emitting unit which inputs arbitrary wavelength components of the wavelength-multiplexed light into said optical filter element from a specific direction;

a light receiving unit which is located on the same optical axis as said second light emitting unit and receives the light transmitted through said optical filter element from said second light emitting unit, and the light from said first light emitting unit reflected at said pair of filter chips on said optical filter element;

a moving unit which moves said optical filter element in the direction of said multiple filter chips so that the light from said first light emitting unit and light from second light emitting unit enter different filter chips; and a controller which controls said moving unit in accordance with the wavelength to be multiplexed and demultiplexed.

6. A wavelength tunable multiplexing and demultiplexing filter device according to claim 5, wherein
said optical filter element has said pair of filter chips deviated in the direction of said multiple filter chips.

7. A wavelength tunable multiplexing and demultiplexing filter device according to claim 5, wherein
said optical filter element is formed on a transparent substrate having first and second surfaces parallel to each other, said first surface on which said one of each paired filter chips are mounted has first reflective area partially contacting each of said filter chips in either set; said second surface on which said other each paired filter chips are mounted has second reflective surface area partially contacting each of said filter chips;

said moving unit moves said optical filter element to a first position so that said first and second input lights from said first and second light emitting units can be inputted into said one pair of second filter chips and reflected component of first input light is reflected on the second surface and then multiplexed with said second input light and to a second position so that said all component of said first input light is reflected on said first and second surfaces and then sent out, in a first direction relative to said filter chips and in a second direction vertical to said first direction within a surface of said optical filter element.

8. A wavelength tunable multiplexing and demultiplexing filter device according to claim 7, further comprising:
a reflecting units which reflect the lights inputted by said first and second light emitting units and the lights obtained through said optical filter element, toward said light receiving unit;

wherein said moving unit moves said reflecting units in a first direction of optical axes of said first and second light emitting units and said light receiving unit and in a second direction having a vertical component of said first direction.

9. A wavelength routing device equipped with multiple wavelength tunable multiplexing and demultiplexing filter devices, each of which demultiplexes arbitrary wavelengths of wavelength-multiplexed light and multiplexes the wavelength-multiplexed light with the same wavelengths as the demultiplexed ones wherein:

each said wavelength tunable multiplexing and demultiplexing filter device comprises:

an optical filter element having a transparent substrate with two sides parallel to each other, said optical filter element having multiple filter chips arranged in two straight line arrangements, said multiple filter chips which respectively transmit at least one of the wavelength components of the wavelength-multiplexed light and said multiple filter chips including a pair of filter chips with the same wavelength characteristic, in mutually corresponding positions on respective sides of said transparent substrate;

a first light emitting unit which emits the wavelength-multiplexed light into said optical filter element from a specific direction;

a second light emitting unit which inputs arbitrary wavelength components of the wavelength-multiplexed light into said optical filter element from a specific direction;

a first light receiving unit which is located on the same optical axis as said first light emitting unit and receives the light transmitted through said optical filter;

a second light receiving unit which is located on the same optical axis as said second light emitting unit and receives the light from said second light emitting unit, which has been transmitted through said optical filter element, and the light from said first light emitting unit, which has been reflected at said pair of filter chips on said optical filter element;

a moving unit which moves said optical filter element in the direction of said multiple filter chips so that the light from said first light emitting unit and light from second light emitting unit enter different filter chips; and a controller which controls said moving unit in accordance with the wavelength to be multiplexed and demultiplexed.

10. A wavelength routing device equipped with multiple wavelength tunable multiplexing and demultiplexing filter devices, each of which demultiplexes arbitrary wavelengths of wavelength-multiplexed light and multiplexes the wavelength-multiplexed light with the same wavelengths as the demultiplexed ones wherein:

each said wavelength tunable multiplexing and demultiplexing filter device comprises:

an optical filter element having a transparent substrate with two sides parallel to each other, said optical filter element having multiple filter chips arranged in two straight line arrangements, said multiple filter chips which respectively transmit at least one of the wavelength components of the wavelength-multiplexed light and said multiple filter chips including a pair of filter chips with the same wavelength characteristic, in mutually corresponding positions on respective sides of said transparent substrate;

a first light emitting unit which emits the wavelength-multiplexed light into said optical filter element from a specific direction;

a second light emitting unit which inputs arbitrary wavelength components of the wavelength-multiplexed light into said optical filter element from a specific direction;

a light receiving unit which is located on the same optical axis as said second light, emitting unit and receives the light transmitted through said optical filter element from said second light emitting unit, and the light from said first light emitting unit reflected at said pair of filter chips on said optical filter element;

a moving unit which moves said optical filter element in the direction of said multiple filter chips so that the light from said first light emitting unit and light from second light emitting unit enter different filter chips; and a controller which controls said moving unit in accordance with the wavelength to be multiplexed and demultiplexed.

\* \* \* \* \*